(12) United States Patent
Rudi

(10) Patent No.: US 7,175,129 B2
(45) Date of Patent: Feb. 13, 2007

(54) DRIVE FOR MAGNETIC TAPE ADJUSTABLE FOR USE WITH TAPES OF DIFFERENT WIDTHS

(75) Inventor: Guttorm Rudi, Fjellhamar (NO)

(73) Assignee: Tandberg Storage ASA, Olso (NO)

( * ) Notice: Subject to any disclaimer, the term of this patent is extended or adjusted under 35 U.S.C. 154(b) by 264 days.

(21) Appl. No.: 10/898,496

(22) Filed: Jul. 23, 2004

(65) Prior Publication Data

US 2006/0016925 A1 Jan. 26, 2006

(51) Int. Cl.
*G11B 15/60* (2006.01)

(52) U.S. Cl. .................. 242/578; 242/578.2; 242/615; 226/192

(58) Field of Classification Search .................. None
See application file for complete search history.

(56) References Cited

U.S. PATENT DOCUMENTS

| | | | | |
|---|---|---|---|---|
| 3,643,849 A | * | 2/1972 | Roberts .................. | 242/615.3 |
| 3,677,499 A | * | 7/1972 | Wangerin ................ | 242/564.5 |
| 3,768,717 A | * | 10/1973 | Salcedo .................. | 242/615.2 |
| 3,831,831 A | * | 8/1974 | Flippen et al. .......... | 242/548.2 |
| 4,193,560 A | * | 3/1980 | Diegel .................... | 242/578.2 |
| 5,414,585 A | | 5/1995 | Saliba | |
| 5,501,386 A | * | 3/1996 | Kobayashi .............. | 226/190 |
| 6,320,727 B1 | | 11/2001 | Cope et al. | |
| 6,600,624 B2 | | 7/2003 | Cope et al. | |

* cited by examiner

*Primary Examiner*—R. S. Tupper
(74) *Attorney, Agent, or Firm*—Schiff Hardin LLP

(57) ABSTRACT

A tape drive has a take-up reel assembly and a tape guide arrangement that are each selectively actuatable for interchangeable use with magnetic recording tape of a first width or a second width. The take-up reel assembly includes at least one actuatable, retractable element that can be moved between the flanges of the take-up reel assembly, dependent on the width of the tape currently being used in the drive, and the tape guide arrangement includes actuatable guide elements movable to define a width of the tape transport path across the read/write head, also dependent on the width of the magnetic recording tape currently being used.

29 Claims, 6 Drawing Sheets

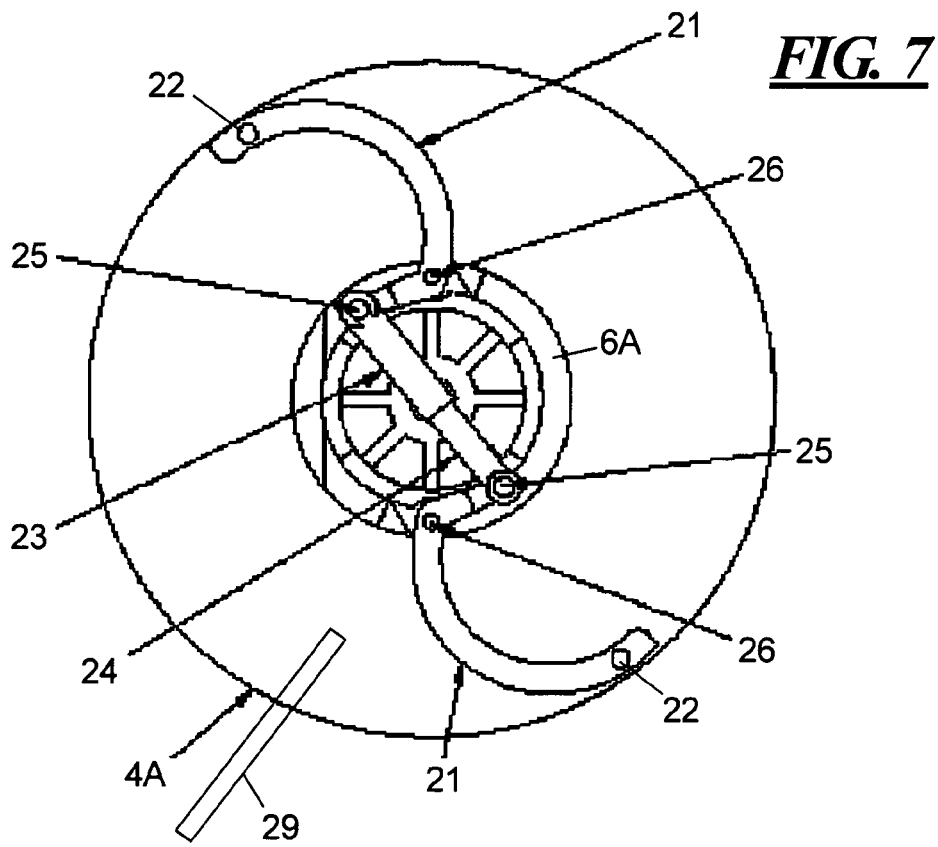
FIG. 7
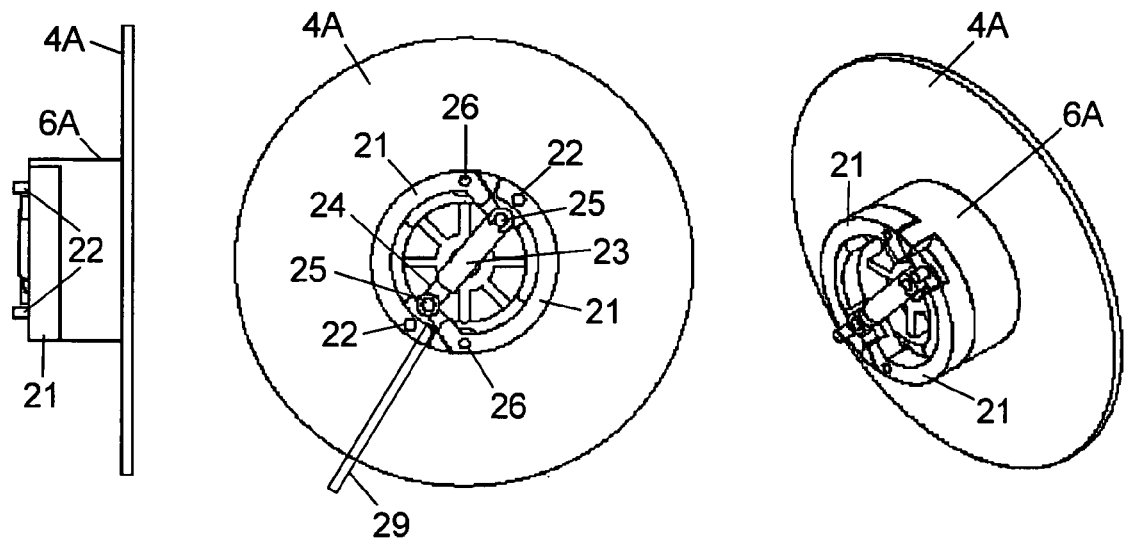
FIG. 8A   FIG. 8B   FIG. 8C

DRIVE FOR MAGNETIC TAPE ADJUSTABLE FOR USE WITH TAPES OF DIFFERENT WIDTHS

BACKGROUND OF THE INVENTION

1. Field of the Invention

The present invention relates in general to tape drives, and in particular to a tape drive that can accept magnetic recording tapes of different widths.

2. Description of the Prior Art

Magnetic tape drives and magnetic tape cartridges are manufactured with standardized dimensions, conforming to an industry-wide form factor, so a standardized magnetic tape cartridge having a particular form factor can always be accepted in a drive designed for that form factor.

Data are magnetically recorded on a tape in adjacent tracks proceeding parallel to the longitudinal length of the tape. The access time to data that are stored at a location that is at some distance from one end of the tape is dependent on the time required to wind or unwind the tape to bring that particular location to a position in front of the read head. In order to reduce this access time, so-called wide tape cartridges have been developed in recent years, which have a tape width that is significantly larger than conventional standard magnetic recording tapes. For example, the standard ULTRIUM cartridge for the LTO drive operates with a tape that has a width of 12.7 mm. Increasing this width by 50%, while maintaining the same length of tape, would increase the storage capacity by 50% as well. Alternatively, if the width were increased by 50% but the total length of the tape were shortened, the same amount of data could be stored on such a tape as can be stored on the conventional, narrower tape, but the access time can be shortened due to the decreased tape length.

It is possible to achieve this increase in the tape width within the height (form factor) of a standard DLT cartridge, so that standard automation equipment can still be used. With this cartridge height, it is still possible to design the drive with the form factor known as 5¼" Half Height.

This means that the standardized tape drive designed for this form factor would be able to receive and operate with a tape cartridge containing tape of the aforementioned narrower width, as well as with a different tape cartridge containing tape of the wider width. A problem associated with such interchangeable operation, however, is that the take-up reel in the tape drive must be designed to accommodate the widest tape width that will be used with the tape drive. This means that when tape of the narrower width is used, the internal dimension of the take-up reel (between the flanges) will be larger than the width of the narrow tape, and as the narrow tape is wound on such a reel, it will tend to meander or wander as it is wound on the hub. Precise alignment of the tape as it passes over the read/write head is important for accurate recording and reading of the data, because the data tracks are so closely packed together that a slight misalignment can cause data to be misread from the wrong track. Although the read/write head has tape guides disposed on opposite sides thereof, such guides operate by guiding the tape over a roller between two flanges, and the spacing between these two flanges must likewise be dimensioned so as to accept the widest tape. Such guides, therefore, would not be effective for accurately guiding the narrower tape.

SUMMARY OF THE INVENTION

It is an object of the present invention to provide a tape drive that is adjustable for alternative operation with a tape cartridge containing narrow tape or with a tape cartridge containing wide tape, wherein the aforementioned tape alignment problems are overcome.

The above object is achieved in accordance with the present invention in a reel assembly, for use as a take-up reel in a tape drive, having a hub and two substantially parallel flanges connected by the hub and held at a fixed spacing from each other by the hub, and having at least one actuatable, retractable element built into one of the flanges of the reel for, when actuated, moving into the space between the flanges to set a spacing between the element and the other of the flanges that is less than the fixed spacing.

The fixed spacing is designed to accommodate the aforementioned standard wide tape, and the spacing that exists when the element has been actuated is designed for accommodating standard, narrow tape.

The above object also is achieved in accordance with the principles of the present invention in a tape drive embodying a reel assembly of the type described above therein, and additionally having actuatable tape guides disposed on opposite sides of the read/write head that are in a first position when a cartridge containing wide tape is being used, and that are actuated so as to be a second position when a cartridge containing narrow tape is being used. In the first position, the static guides present flanges to the tape path having a spacing (distance) therebetween suitable for guiding wide tape. In the second position, the static guides present flanges to the tape path having a spacing therebetween suitable for guiding narrow tape.

In a second embodiment of the tape drive, four guide rollers are employed, two of which are non-movable and are respectively disposed on opposite sides of the read/write head, and two of which are movable (actuatable) in a direction parallel to the rotational axis of the take-up reel, and also are respectively disposed on opposite sides of the read/write head. When the movable rollers have not been actuated, the flanges of all of the rollers are aligned in a direction parallel to the direction of tape movement, so that wide tape is guided between the two flanges of each roller. When the movable rollers are actuated, narrow tape can be guided between one flange of each of the non-movable rollers, and one flange of each of the movable rollers.

The aforementioned at least one actuatable, retractable element in the reel assembly is, in a first embodiment, formed by a rib mounted on a rotatable shaft that proceeds radially from a central region (such as the hub) of one of the flanges to a periphery of that flange. One end of this shaft has a gear mounted thereon, which engages a toothed rack. Actuation of the rack rotates the gear and the shaft, and thereby flips the element carried on the shaft into or out of the space between the flanges of the reel assembly, thereby setting the spacing of the reel assembly for accommodating either wide tape or narrow tape. The rib and the rack can be set so that the rib is normally flush with the flange in which it is mounted, so that actuation of the rack causes the rib to decrease the spacing, or the rib and the rack can be set so that the rib is normally in a deployed state between the flanges and actuation of the rack causes the rib to be moved flush with the flange in which it is mounted. In the first arrangement, the reel assembly is "normally" set for accepting wide tape, and the rack must be actuated to accommodate narrow tape. The opposite is the case for the second situation.

In a further embodiment of the reel assembly, two such elements are formed by two curved arms that are each pivotably mounted to an expandable/compressible element, such as a telescoping element, disposed in the hub of the reel assembly. Each of these curved arms has a pin at the end thereof, which projects through a curved opening in one of the flanges, these pins projecting above the exterior surface of this flange. The compressible/expandable element is spring-biased so as to normally force these pins to their extreme outwardly radial position, with the respective pins at the radial ends of the respective slots in the flange. When so deployed, the presence of these curved arms decreases the spacing in the interior of the reel assembly, for accommodating narrow tape. For operation with wide tape, a slide arm is actuated that slides across the exterior surface of the flange through which the pins project. As the reel assembly is rotated, the pins projecting above this exterior surface of this flange abut the slide arm, and are forced to follow the curved openings as the reel assembly rotates further. This forces the curved arms to move between the flanges toward the hub, against the spring bias, so that the curved arms eventually come to a retracted position wherein they closely surround the hub. The spacing between the two flanges then is suitable for accommodating wide tape.

DESCRIPTION OF THE DRAWINGS

FIG. 7 shows the plan view of the flange of FIG. 6B, with the slide arm beginning to move into a position for interacting therewith.

FIG. 8A is a side view, FIG. 8B is a plan view, and FIG. 8C is a perspective view, of the flange shown in FIGS. 6A, 6B and 6C, after being completely retracted by the slide arm, positioned for wide tape.

DESCRIPTION OF THE PREFERRED EMBODIMENTS

Figure 1:
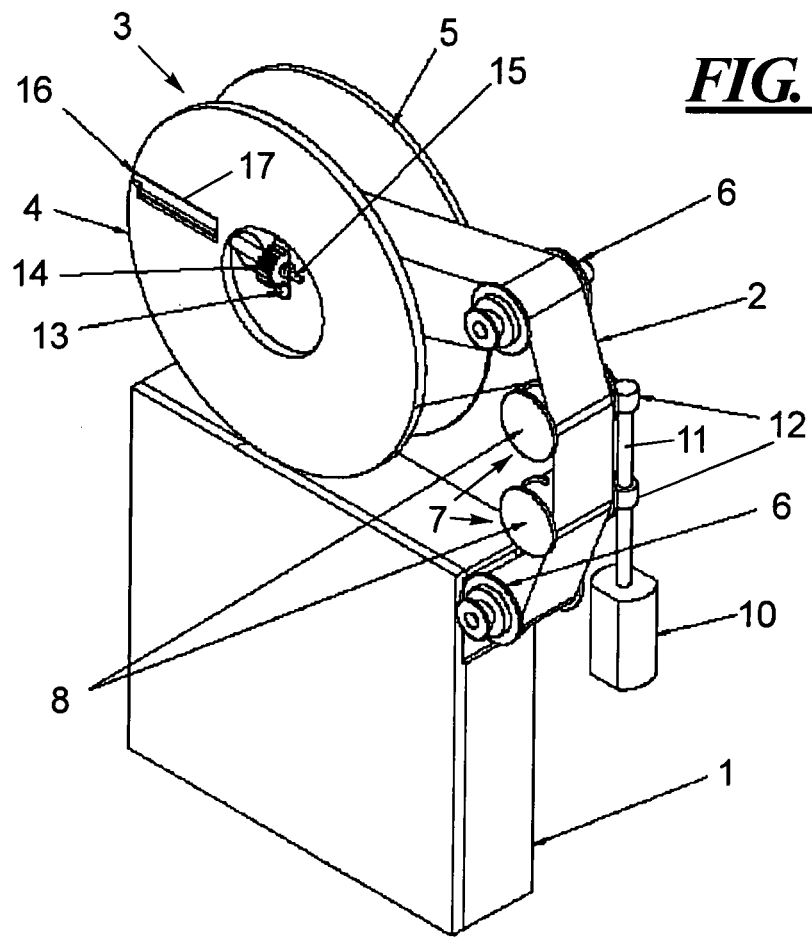
FIG. 1 shows a take-up reel assembly and the basic components of a tape drive in accordance with the invention, positioned for wide tape.

FIG. 1 shows a first embodiment of a take-up reel assembly 3 and the basic components of a first embodiment of tape drive in accordance with the invention, for use with a cartridge 1 containing wide tape 2. The components are mounted in a drive housing (not shown) and include two guide rollers 6 disposed on opposite sides of a read/write head 18 (not shown in FIG. 1, but shown in FIG. 2). The tape drive in this embodiment also includes two static guides 7 (meaning guides without rollers), also respectively disposed on opposite sides of the read/write head 18. Each of these static guides 7 is rotatable around a central axis so that, in the position shown in FIG. 1, the static guides 7 present a flange 8 to the path of the magnetic tape that is disposed at a location for guiding the wide tape 2.

Figure 3:
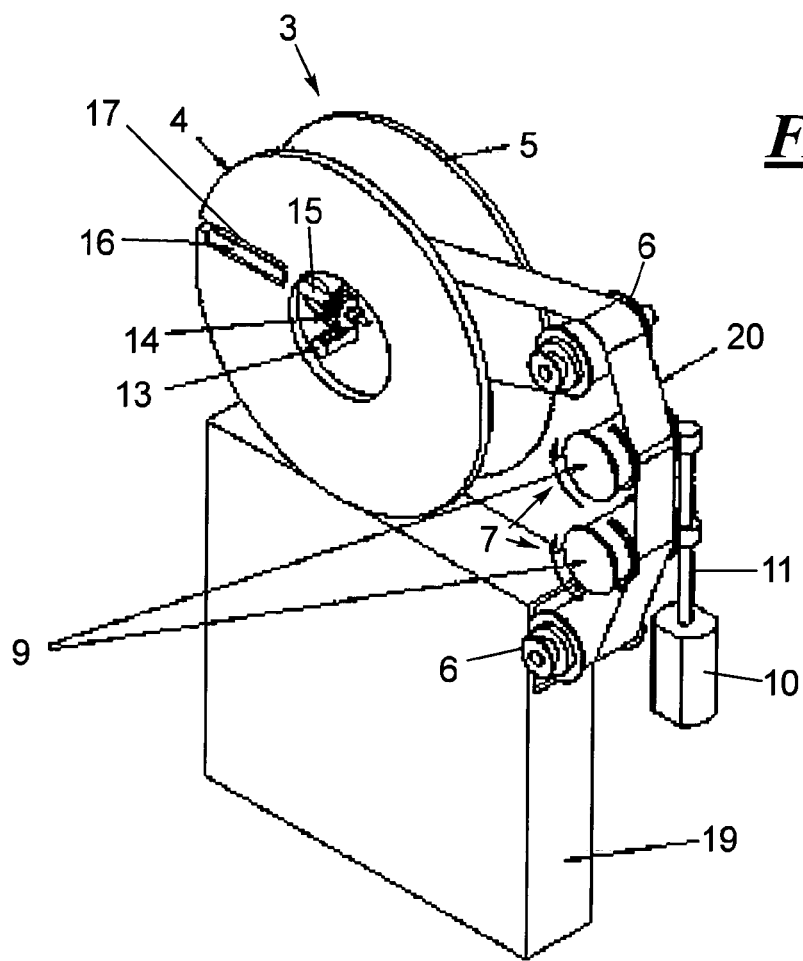
FIG. 3 shows the tape-up reel assembly and the components of FIG. 1 positioned for narrow tape.

FIG. 3 shows the tape drive in use with a cartridge 19 containing narrow tape 20. In FIG. 3, the static guides 7 have been rotated to present a flange 9 to the tape path that produces a guide channel for guiding the narrow tape. Rotation of the static guides 7 is accomplished by a drive motor 10 having a drive shaft 11 on which two worms 12 are mounted. Each worm engages a gear (not shown) at the bottom of the respective static guide 7. When the drive motor 10 is actuated, the worms 12 cause rotation of the static guides 7 to present the appropriate flange to the tape path.

Figure 2:
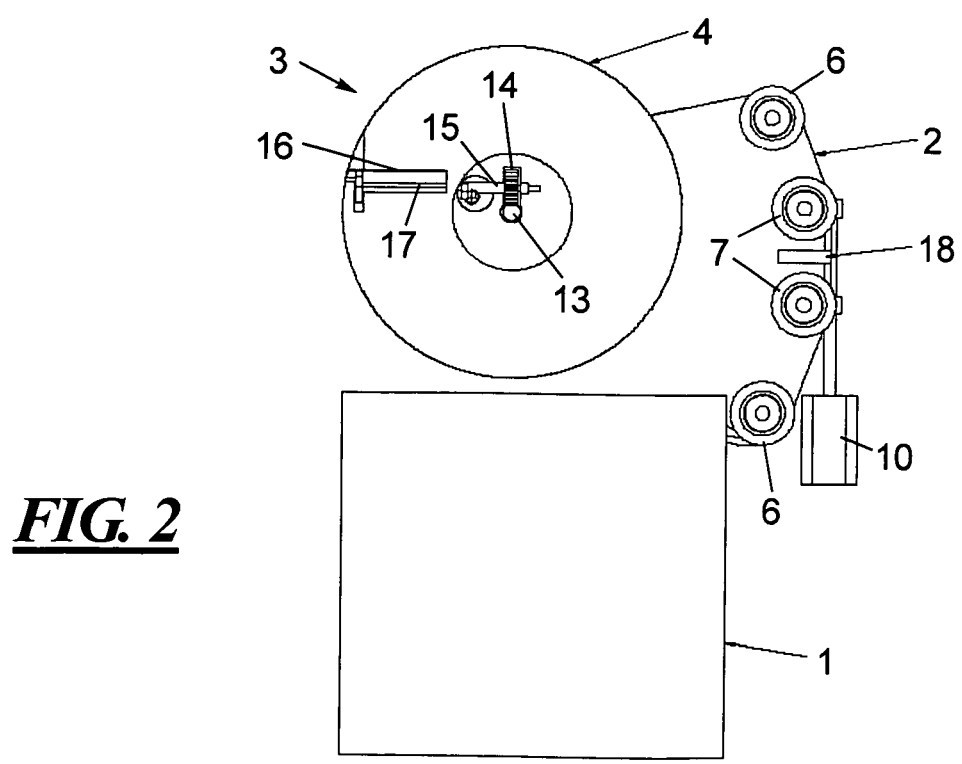
FIG. 2 shows the take-up reel assembly and components of FIG. 1 in a plan view, showing the read/write head position.

Also shown in each of FIGS. 1, 2 and 3 is a first embodiment of an arrangement for setting different spacings in the interior of the reel assembly 3, depending on the width of the tape that is currently being used in the drive. This first embodiment of the spacing-setting arrangement also is shown in detail in FIGS. 4A, 4B and 5A, 5B.

Figure 4A:
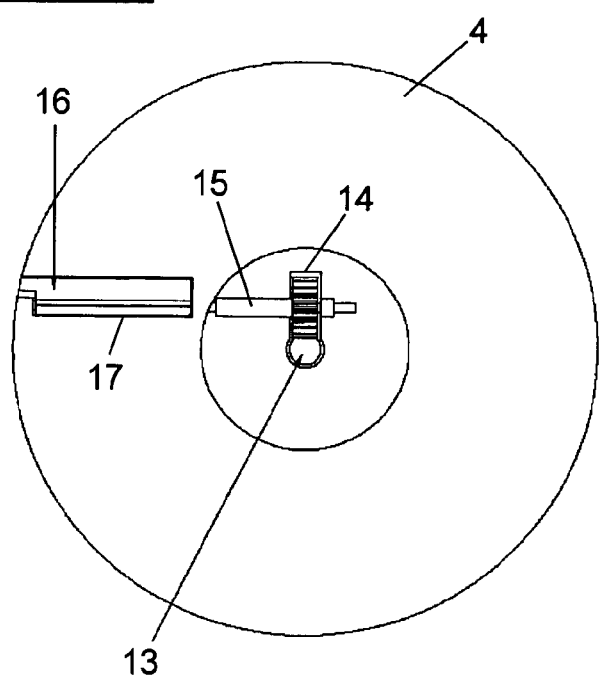
FIG. 4A is a plan view.
Figure 4B:
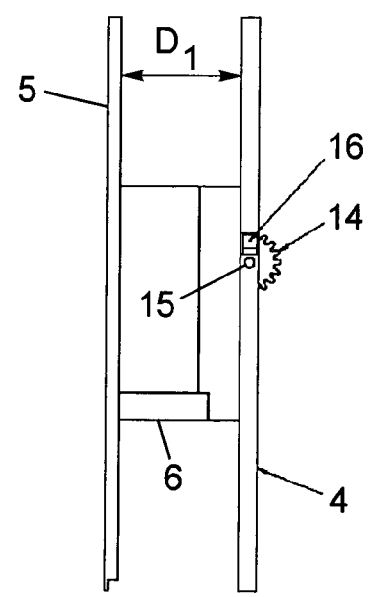
FIG. 4B is a side view, of a first embodiment of the take-up reel assembly in accordance with the invention, positioned for wide tape.

The reel assembly 3 has two substantially parallel flanges 4 and 5 connected to each other and held at a fixed spacing from each other by a hub 6. This hub 6 is hollow, and within the hollow interior of the hub 6, an actuatable rack 13 is movable back and forth, i.e., in a direction perpendicular to the plane of the drawing of FIGS. 4A and 5A. This rack 13 engages a gear 14 that is mounted on a rotatable shaft 15 that proceeds from the interior of the hub 6 to the periphery of the flange 4. This shaft 15 carries a rib 16 thereon that, in a non-deployed position, is disposed in a slot 17 so as to be flush with the flange 4, as shown in FIGS. 4A and 4B. The spacing between the facing interior surfaces of the flanges 4 and 5 in this situation is D1.

Figure 5A:
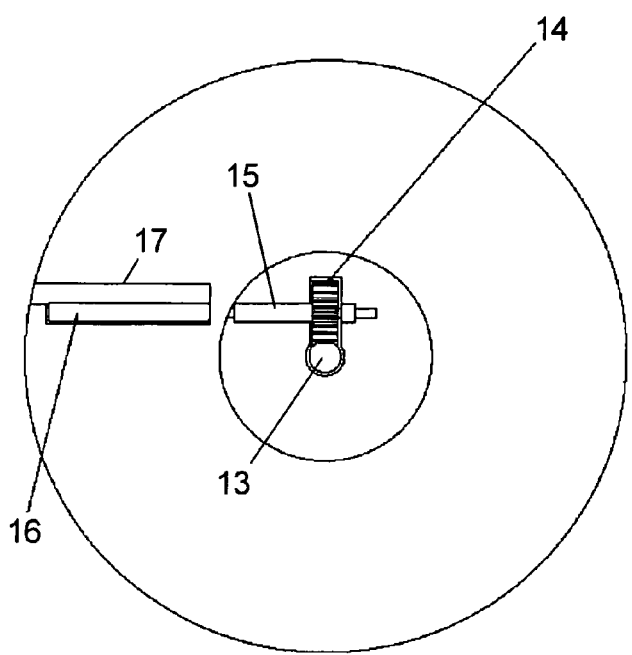
FIG. 5A is a plan view.
Figure 5B:
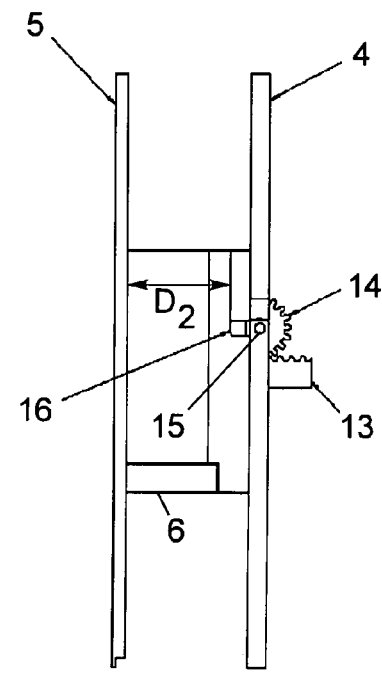
FIG. 5B is a side view of the first embodiment of the take-up reel assembly in accordance with the invention, positioned for narrow tape.

As shown in FIGS. 5A and 5B, when the rack 13 is actuated, the gear 14 and the shaft 15 are rotated, causing the rib 16 to move into the space between the flanges 4 and 5, thereby reducing the spacing between the rib 16 and the flange 5 to D2. The spacing D1 is suitable for winding wide tape 2 on the reel assembly 3, and the spacing D2 is suitable for winding narrow tape 20. The rib 16 extends along the winding space between the flanges 4 and 5, and is sufficient, when deployed, to accurately wind narrow tape 20 on the reel assembly 3, without the narrow tape 20 wandering or meandering in the tape pack.

Actuation of the rack 13 can be initiated in any suitable manner, such as by a detector arrangement that detects which type of tape cartridge (wide tape-containing or narrow tape-containing) is currently inserted in the drive.

The above embodiment has been described with actuation of the rack 13 causing the rib 16 to be deployed, however, it is apparent that the reel assembly 3 can easily be designed for the opposite situation, wherein the rib 16 is "normally" deployed, and actuation of the rack 13 causes retraction of the rib 16.

Figure 6A:
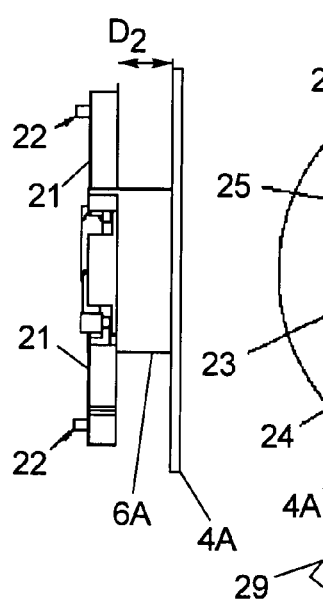
FIG. 6A is a side view.
Figure 6B:
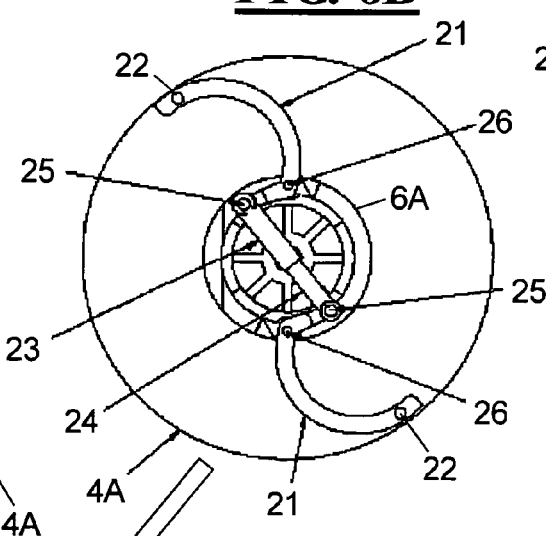
FIG. 6B is a top view.
Figure 6C:
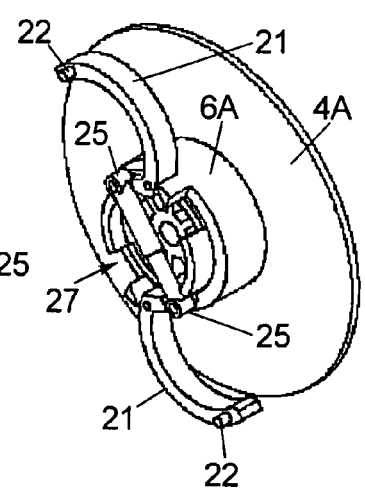
FIG. 6C is a perspective view, of one flange of a take-up reel assembly in accordance with the invention, in a second embodiment, together with a slide arm that interacts therewith, positioned for narrow tape.

A second embodiment for the spacing setting arrangement is shown in FIGS. 6A, 6B, 6C, FIG. 7, FIGS. 8A, 8B and 8C, and FIGS. 9A, 9B and 9C. In this embodiment, as shown in FIGS. 6A, 6B and 6C, one of the flanges 4A carries two curved ribs 21 thereon, each mounted to a pivoting arrangement disposed in the hollow interior of the hub 6A. This pivoting arrangement includes an expandable contractible element 27 such as (in the exemplary embodiment) a telescoping element composed of telescoping members 23 and 24. The outer ends of the respective telescoping members 23 and 24 are attached by pivot pins 25 to pivot arms of the curved ribs 21. Each pivot arm joins the curved part of the curved rib 21 and a junction, which rotates around a pivot pin 26 projecting from the hub 6A. The expandable/contractible member 27 is rotatable around a central axle (not shown) in the hub 6A. A spring (not shown) is disposed in the hollow interior of the telescoping members 23 and 24, forcing them apart so that the curved ribs 21 are normally in the position shown in FIGS. 6A, 6B and 6C.

An actuatable slide arm 26 is mounted in the drive, and is actuatable under the same conditions as the aforementioned rack 13 in the first embodiment. The slide arm 29 in the exemplary embodiment is normally in a position relative to the reel assembly 3 as shown in FIG. 6B. When actuated, it begins to move through the position shown in FIG. 7, and eventually comes to the position shown in FIG. 8B.

Figure 9A:
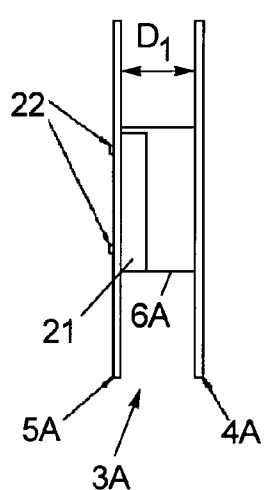
FIG. 9A is a side view.
Figure 9B:
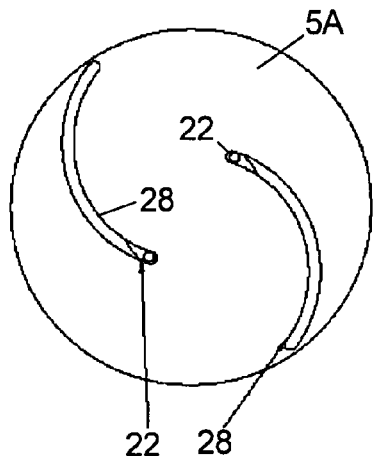
FIG. 9B is a top view.
Figure 9C:
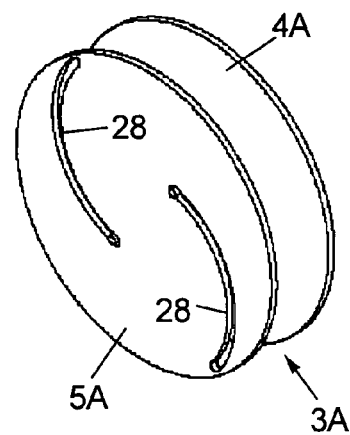
FIG. 9C is a perspective view, of the complete take-up reel assembly in accordance with the invention, in the second embodiment of the take-up reel assembly.

Each curved rib 21 carries a pin 22 at the free end thereof. These pins 22 slide in curved slots 28 in the flange 5A of the reel assembly 3, as shown in FIGS. 9A, 9B and 9C. The pins extend through these slots 28, and project slightly above the exterior surface of the flange 5A. As the slide arm 29 is actuated and the reel assembly 3 is rotated, the pins 22 come to abut against the slide arm 29, and as the reel assembly 3 continues to rotate, the pins 22 are forced to follow the curved slots 28, thereby forcing the curved ribs 21 against the force of the spring bias, so as to cause the curved ribs 21 to close tightly around the exterior of the hub 6A, as shown in FIGS. 8A, 8B and 8C.

When the curved ribs 21 are in the deployed position as shown in FIGS. 6A, 6B and 6C, they decrease the spacing between the ribs 21 and the flange 5A to the spacing D2, suitable for narrow tape 20. When the curved ribs are retracted, as shown in FIGS. 8A, 8B and 8C (with the pins in the position shown in FIG. 9B), the spacing D1 exists between the flanges, suitable for wide tape 2.

As in the previous embodiment, instead of being "normally" in the deployed condition shown in FIGS. 6A, 6B and 6C, the spring in the expansion/contraction element 27 can be a compression spring, which biases the expansion/contraction element to "normally" be in the position shown in FIGS. 8A, 8B and 8C. In this version, actuation of the slide arm causes the pins to ride in the slots radially inwardly to outwardly (as opposed to outwardly to inwardly in the previously-described version) to bring the curved ribs to the position shown in FIGS. 7A, 7B and 7C. (This would require the reel assembly 3, however, to rotate in an opposite direction of winding tape.)

Figure 10:
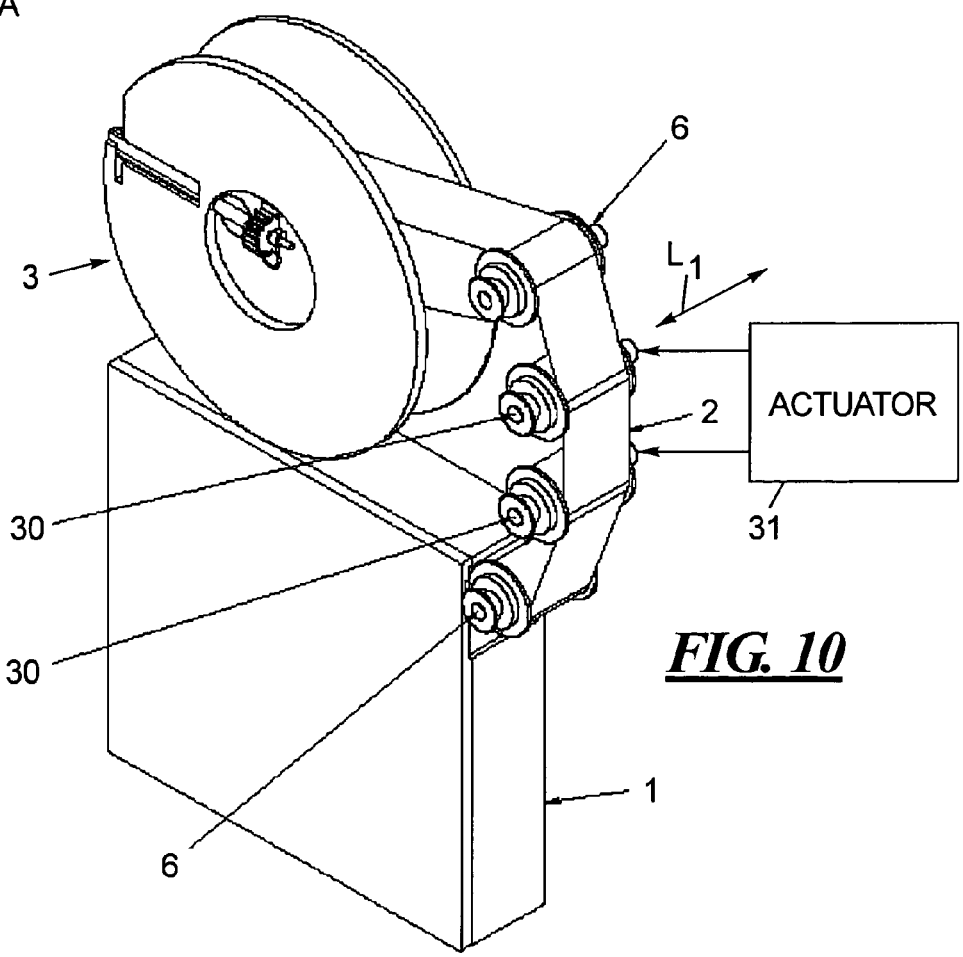
FIG. 10 shows a take-up reel assembly and the basic components of a tape drive in the second embodiment of the drive, positioned for wide tape.
Figure 11:
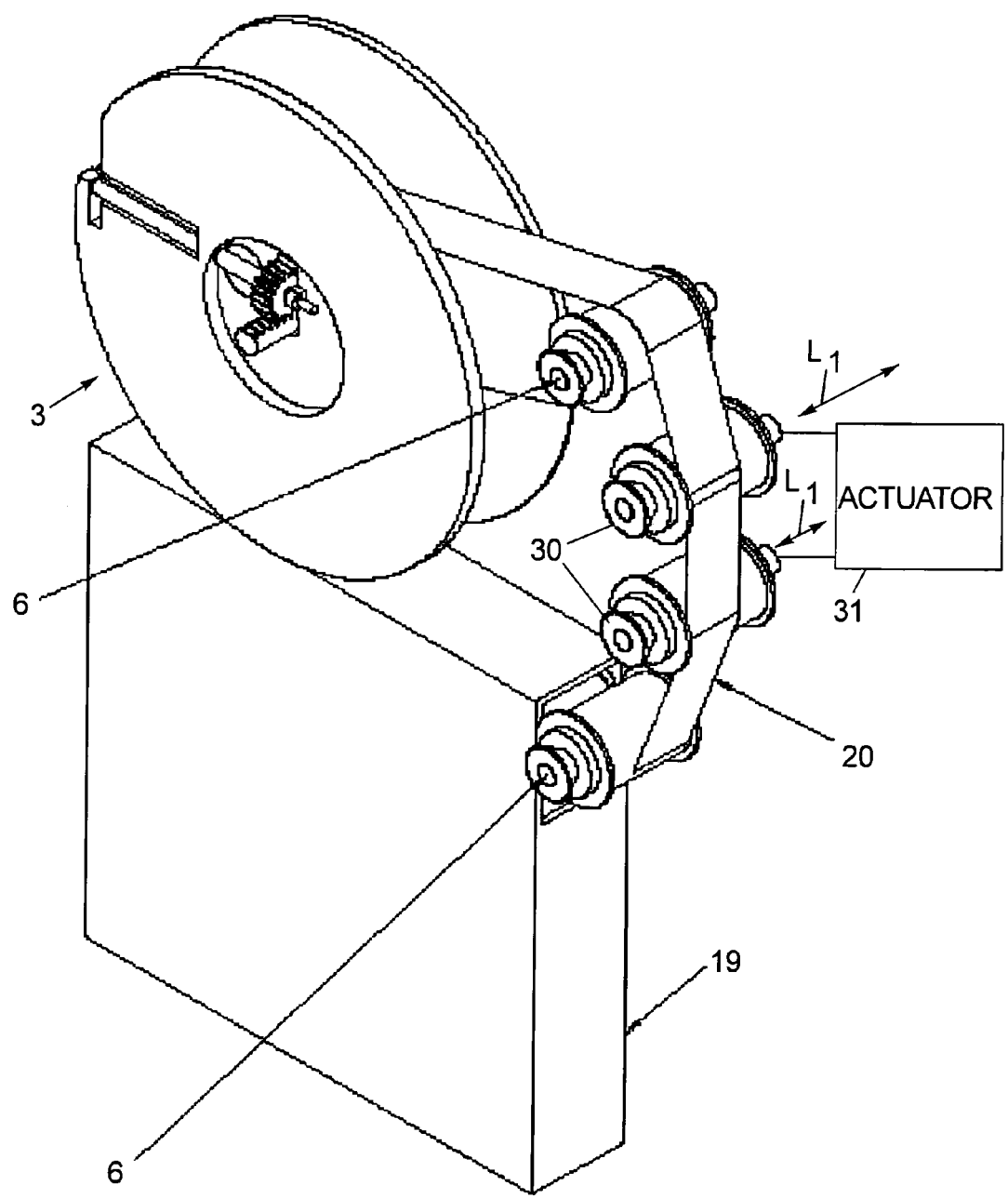
FIG. 11 shows the take-up reel assembly and the components of FIG. 10, positioned for narrow tape.

A further embodiment for setting the guiding of the magnetic tape in the tape drive outside of the reel assembly as shown in FIGS. 10 and 11. In this embodiment, four guide rollers are employed, including the aforementioned guide rollers 6. Two of these guide rollers, namely guide rollers 30 are movable, as shown in FIG. 11, by an actuator 31 in the direction L1. This actuation occurs under the same conditions that actuate the setting arrangement of the reel assembly 3, and preferably occurs simultaneously therewith, or substantially simultaneously therewith. When all four of the guide rollers 6 and 30 are in the position shown in FIG. 10, wide tape 2 can be accurately guided. When the two guide rollers 30 are moved to the position shown in FIG. 11, narrow tape 20 is guided by the combination of the bottom flanges of the rollers 6 and the top flanges of the rollers 30 that have been moved by actuation. The movement occurs in a direction parallel to the rotational axis of the reel assembly 3.

This second embodiment of the drive has been shown in FIGS. 10 and 11 in combination with the first embodiment of the width setting arrangement of the reel assembly 3, but it is apparent it can be used in combination with the second embodiment of the width setting arrangement as well.

Although modifications and changes may be suggested by those skilled in the art, it is the intention of the inventor to embody within the patent warranted hereon all changes and modifications as reasonably and properly come within the scope of his contribution to the art.

I claim as my invention:

1. A reel assembly for interchangeable use for winding and unwinding either of tape-like material of a first width and tape-like material of a second width, comprising:
   a reel having a hub and two substantially parallel flanges connected by said hub and held at a fixed spacing from each other by said hub conforming to said first width; and
   an actuatable, retractable element built into said reel for movement, when actuated, between said flanges for changing a distance between said element and one of said flanges between said fixed spacing and a smaller spacing conforming to said second width.

2. A reel assembly as claimed in claim 1 wherein said at least one element is built into a first of said flanges, and when actuated, changes a distance between said element and a second of said flanges.

3. A reel assembly as claimed in claim 2 wherein said first of said flanges has a radial recess therein and an interior surface facing said second of said flanges, and wherein said at least one element is disposed in said radial recess and is movable, when actuated between a position flush with said interior surface and a position projecting from said interior surface.

4. A reel assembly as claimed in claim 3 wherein said at least one element comprises a rib mounted on a shaft rotationally mounted in said radial recess.

5. A reel assembly as claimed in claim 4 comprising a gear mounted on said shaft, and an actuatable toothed rack engaging said gear for rotating said gear and said shaft to move said rib between said position flush with said interior surface and said position projecting from said interior surface.

6. A reel assembly as claimed in claim 1 wherein said at least one actuatable element is built into said hub.

7. A reel assembly as claimed in claim 6 wherein said hub has an exterior peripheral surface and wherein said at least one element, when actuated, is movable between a position flush with said exterior peripheral surface, and a position projecting from said exterior peripheral surface and directly adjacent one of said flanges.

8. A reel assembly as claimed in claim 7 wherein said exterior peripheral surface of said hub has a radius of curvature, and wherein said at least one element comprises a curved rib having a radius of curvature conforming to said radius of curvature of said exterior peripheral surface of said hub.

9. A reel assembly as claimed in claim 7 wherein said exterior peripheral surface of said hub has a radius of curvature, and comprising two actuatable, retractable elements, each of said elements comprising a curved rib having a radius of curvature conforming to said radius of curvature of said exterior peripheral surface of said hub.

10. A reel assembly as claimed in claim 9 comprising two pivot pins carried by said hub on which said curved ribs are respectively rotatably mounted for movement between said position flush with said exterior peripheral surface and said position projecting from said exterior peripheral surface.

11. A reel assembly as claimed in claim 10 wherein each of said curved ribs has a first end disposed at said hub and a second end movable away from said hub, and comprising an expandable/contractible element rotatably mounted in said hub and connected to each of said first ends and normally biasing said curved ribs into one of said position flush with said exterior peripheral surface and said position projecting from said exterior peripheral surface.

12. A reel assembly as claimed in claim 11 wherein each of said curved ribs has a pin at the second end thereof, and wherein said one of said flanges has two curved slots therein into which said pins respectively engage and project above an exterior surface of said one of said flanges, and comprising a slide arm movable across said exterior surface of said one of said flanges for abutting said pins and, upon rotation of said reel assembly, forcing said pins to move in the respective slots for moving said curved ribs between said position flush with said exterior peripheral surface and said position projecting from said exterior peripheral surface.

13. A reel assembly as claimed in claim 11 wherein said expandable/contractible element comprises a telescoping element having a hollow interior containing a spring for producing said biasing of said curved ribs.

14. A reel assembly as claimed in claim 1 wherein said at least one element, when not actuated, occupies a position setting said distance equal to said fixed spacing and, when actuated, occupies a position setting said distance to said smaller spacing.

15. A method for modifying a reel assembly for interchangeable use with either of tape-like material having a first width and tape-like material having a second width, said reel assembly having two substantially parallel flanges connected by a hub and held at a fixed spacing from each other by said hub, said method comprising the steps of:
  building an actuatable element into said reel assembly for movement between a first position setting a winding height between said flanges conforming to said first width, and a second position for setting a winding height between said flanges conforming to said second width; and
  selectively actuating said element to set said winding height dependent on whether said reel assembly is being used with said tape material of said first width or said tape material of said second width.

16. A method as claimed in claim 15 comprising building said at least one element into one of said flanges.

17. A method as claimed in claim 15 comprising building said at least one element into said hub.

18. A method as claimed in claim 15 wherein said first width is wider than second width, and wherein the step of actuating said at least one element comprises actuating said at least one element from a retracted position, as said first position, to an actuated position, as said second position, projecting into a space between said flanges.

19. A drive for interchangeable use with magnetic recording tape having a first width and magnetic recording tape having a second width, comprising:
  a read/write head adapted to interact with magnetic recording tape moving in a transport path across said read/write head; and
  a selectively adjustable tape guiding arrangement that defines and limits said transport path, including actuatable elements each movable between a position for giving said transport path a path width conforming to said first width and a position for giving said transport path a path width conforming to said second width.

20. A drive as claimed in claim 19 wherein each of said actuatable elements comprises a static tape guide having a first end and a second end and a longitudinal axis proceeding between said first and second ends around which the static tape guide is rotatable, and having a first flange disposed at said first end, a second flange disposed at said second end at a spacing from said first flange conforming to said first width, and a third flange disposed at said second end having a spacing from said first flange conforming to said second width, and wherein said tape guiding arrangement comprises an actuator connected to each of said static tape guides for rotating both of said tape guides for causing one of said second flange or said third flange to face said transport path.

21. A drive as claimed in claim 20 wherein said actuator comprises:
  at each of said static tape guides, a gear mounted for rotation around said longitudinal axis;
  a motor;
  a drive shaft driven by said motor; and
  two worms mounted on said drive shaft respectively engaging the gears respectively at said static tape guides for rotating said gears and said static tape guides around the respective longitudinal axes.

22. A drive as claimed in claim 21 wherein, at each of said static tape guides, said gear is attached to said first end of that static tape guide.

23. A drive as claimed in claim 19 wherein said first width is wider than said second width, and wherein said tape guiding arrangement comprises two roller guides respectively disposed at said opposite sides of said read/write head, each of said roller guides having two flanges spaced from each other at a distance conforming to said first width.

24. A drive as claimed in claim 19 wherein said first width is wider than said second width, and wherein said tape guiding arrangement comprises:
  four guide rollers each having two flanges disposed at a distance from each other conforming to said first width, and each guide roller being rotatable around a longitudinal axis proceeding between said two flanges, the respective longitudinal axes being parallel with each other;
  a first pair of said guide rollers being respectively disposed on opposite sides of said read/write head and being movable in a direction parallel to said longitudinal axes;
  a second pair of said guide rollers being respectively disposed at said opposite sides of said read/write head and being non-movable in said direction parallel to said axes; and
  an actuator for moving said first pair of guide rollers between a first position, wherein all of said flanges of all of said guide rollers are aligned, for setting said first path width, to a position for defining said second path width by two aligned flanges of the respective rollers in said first pair and two aligned flanges of the respective rollers in said second pair.

25. A method for selective setting a tape drive for interchangeable use with magnetic recording tape of a first width and magnetic recording tape of a second width, comprising the steps of:
   guiding magnetic recording tape in a transport path in a tape drive across a read/write head with a plurality of guide elements, each guide element having flanges between which said magnetic recording tape is guided; and
   selectively moving two of said guide elements, respectively disposed on opposite sides of said read/write head, to move one of said flanges on each of said two of said guide elements between a position defining a path width of said transport path conforming to said first width and a position defining a path width of said transport path conforming to said second width.

26. A method as claimed in claim 25 wherein the step of moving said two of said guide elements comprises rotating said two of said guide elements.

27. A method as claimed in claim 25 wherein the step of moving said two of said guide elements comprises moving said two of said guide elements in a direction perpendicular to a transport direction of said magnetic recording tape in said transport path.

28. A device for interchangeable use for winding and unwinding magnetic recording tape of a first width and magnetic recording tape of a second width, comprising:
   a reel having a hub and two substantially parallel flanges connected by said hub and held at a fixed spacing from each other by said hub conforming to said first width;
   an actuatable, retractable element built into said reel for movement, when actuated, between said flanges or changing a distance between said element and one of said flanges between said fixed spacing and a smaller spacing conforming to said second width;
   a read/write head adapted to interact with magnetic recording tape moving in a transport path across said read/write head;
   a selectively adjustable tape guiding arrangement that defines and limits said transport path, including actuatable elements each movable between a position for giving said transport path a path width conforming to said first width and a position for giving said transport path a width conforming to said second width; and
   an actuation system for substantially simultaneously actuating said at least one element built into said reel and said actuatable elements in said guiding arrangement.

29. A method for modifying a drive for interchangeable use with either of magnetic recording tape having a first width and magnetic recording tape having a second width, said drive having a read/write head and a reel assembly having two substantially parallel flanges connected by a hub and held at a fixed spacing from each other by said hub, said method comprising the steps of:
   building an actuatable element into said reel assembly for movement between a first position setting a winding height between said flanges conforming to said first width, and a second position for setting a winding height between said flanges conforming to said second width;
   selectively actuating said element to set said winding height dependent on whether said drive is being used with said magnetic recording tape of said first width or said magnetic recording tape of said second width;
   guiding said magnetic recording tape in a transport path across said read/write head with a plurality of guide elements, each guide element having flanges between which said magnetic recording tape is guided; and
   selectively moving two of said guide elements, respectively disposed on opposite sides of said read/write head, to move one of said flanges on each of said two of said guide elements between a position defining a path width of said transport path conforming to said first width and a position defining a path width of said transport path conforming to said second width.

* * * * *